(12) United States Patent
Eguchi et al.

(10) Patent No.: US 7,177,163 B2
(45) Date of Patent: Feb. 13, 2007

(54) TWO-WAY DC-DC CONVERTER

(75) Inventors: Hiroyuki Eguchi, Saitama (JP); Motohiro Shimizu, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 93 days.

(21) Appl. No.: 10/781,699

(22) Filed: Feb. 20, 2004

(65) Prior Publication Data

US 2004/0179381 A1    Sep. 16, 2004

(30) Foreign Application Priority Data

Mar. 13, 2003   (JP) ............................. 2003-067967

(51) Int. Cl.
*H02M 3/335* (2006.01)
*H02M 7/5387* (2006.01)

(52) U.S. Cl. .................... 363/17; 363/65; 363/98; 363/132

(58) Field of Classification Search .............. 363/16, 363/17, 21.01, 65, 68, 71, 75, 98, 132
See application file for complete search history.

(56) References Cited

U.S. PATENT DOCUMENTS

| | | | | |
|---|---|---|---|---|
| 3,893,015 A | * | 7/1975 | Weil ............................ | 363/71 |
| 6,344,985 B1 | * | 2/2002 | Akerson ..................... | 363/65 |
| 6,979,934 B1 | * | 12/2005 | Wischnewskiy ........ | 310/323.01 |
| 2003/0198064 A1 | * | 10/2003 | Zhu et al. ................ | 363/21.01 |

FOREIGN PATENT DOCUMENTS

JP   2002-165448   6/2002

OTHER PUBLICATIONS

Hofsajer I W et al: "A new manufacturing and packaging technology for the integration of power electronics" Industry Applications Conference, 1995. Thirtieth IAS Annual Meeting, IAS '95., Conference Record of the 1995 IEEE Orlando, FL, USA Oct. 8-12, 1995, New York, NY, USA, IEEE, US, vol. 1, Oct. 8, 1995, pp. 891-897, XP010193038 ISBN: 0-7803-3008-0 * table 1 * * abstract * * p. 891, right-hand column, paragraph 2 * * p. 894, left-hand column, paragraphs 5,6 * * figure 3 *.

(Continued)

*Primary Examiner*—Jessica Han
(74) *Attorney, Agent, or Firm*—Westerman, Hattori, Daniels & Adrian LLP.

(57) ABSTRACT

Rectifying elements are connected in parallel with switching elements 4-1 through 4-4 in a switching section 4 for the lower voltage side and rectifying elements are connected in parallel with switching elements 5-1 through 5-4 in a switching section 5 for the higher voltage side. An LC resonant circuit 6 is provided between the winding wire 3-2 for the high-voltage side in the transformer 3 and the switching section 5 for the higher voltage side; currents which flows on the primary side and the secondary side is changed into a sinusoidal one; and switching is executed in the vicinity of the zero crossing points of the currents.

2 Claims, 4 Drawing Sheets

OTHER PUBLICATIONS

Rufer A et al: "A supercapacitor—based energy storage system for elevators with soft commutated interface" Conference Record of the 2001 IEEE Industry Applications Conference. 36TH IAS Annual Meeting. Chicago, IL, Sep. 30-Oct. 4, 2001, Conference Record of the IEEE Industry Applications Conference. IAS Annual Meeting, New York, NY: IEEE, US, vol. vol. 1 of 4. CONF. 36, Sep. 30, 2001, pp. 1413-1418, XP010561878 ISBN: 0-7803-7114-3 * figure 9 * * p. 1416, left-hand column, last paragraph * * p. 1417, right-hand column, last paragraph *.

Chan H L et al: "Phase-shift controlled DC-DC convertor with bi-directional power flow" IEE Proceedings: Electric Power Applications, Institution of Electrical Engineers, GB, vol. 148, No. 2, Mar. 12, 2001, pp. 193-201, XP006016161 ISSN: 1350-2352 * abstract * * figure 1 * * p. 193, left-hand column, paragraphs 2,3 *.

European Search Report dated Feb. 24, 2006 for corresponding European patent application No. 04005590.

* cited by examiner

TWO-WAY DC-DC CONVERTER

BACKGROUND OF THE INVENTION

1. Field of the Invention

The present invention relates to a two-way DC-DC converter, and more particularly, to a two-way DC-DC converter which can reduce switching losses and is able to simplify the control system.

2. Description of the Related Art

For example, some of vehicles have two power supply systems with different voltages. When two-way exchange of electric power in such two direct-current (DC) power supply systems with different voltages is executed, it is common to adopt a configuration, in which a DC step-up circuit and a DC step-down circuit are disposed in parallel with each other between the DC power supply systems and the circuits are used, as necessary.

Moreover, there has been made a proposal in which, when two-way exchange of electric power between the DC power supply systems is executed, a two-way DC-DC converter is used in order to obtain an enough high DC voltage by a small-scale circuit.

For example, the Japanese Patent Application Laid-open No. 2002-165448 has disclosed a two-way DC-DC converter in which two-way type DC-AC transformation sections are provided on both sides of a transformer. Especially, a secondary DC-AC transformation section has a configuration in which a chalk coil operating as a smoothing coil is used as a chalk coil for a chopper-circuit type inverter using a choke coil at forward power transmission (step-down power transmission from a first DC terminal to a second DC terminal), and a switching and rectifying section between the chalk coil and a secondary coil of the transformer functions as a rectifier at forward-power transmission and is used as a chopper circuit at reverse-power transmission (step-up power transmission from the second DC terminal to the first DC terminal).

However, there has been a problem that the configuration in which a DC step-up circuit and a DC step-down circuit are disposed in parallel with each other between two DC power supply systems has a large scale circuit, and, at simultaneous operation, enough performance cannot be obtained due to, for example, voltage losses in the circuit.

Moreover, in the two-way DC-DC converter as disclosed in the above publication, since a switching element in the DC-AC transformation section executes ON-OFF control of a large current, and the current passes through an unsaturated range of the switching element when the large current becomes a zero current by OFF control of the switching element, an operation like an analog operation is actually is executed to cause large switching losses.

Furthermore, while driving in full synchronization between the primary DC-AC transformation section and the secondary DC-AC transformation section, there is a possibility that a large current might flow on the switching element when a current by one of the DC-AC transformation section flows and ON control of the other DC-AC transformation section is executed.

SUMMARY OF THE INVENTION

The object of the present invention is to solve the above problems, and to provide a two-way DC-DC converter in which switching losses can be reduced; there can be eliminated a possibility that a large current might flow on a switching element at ON-OFF control; and efficient two-way exchange of electric power between DC power supply systems can be realized by a simple control system.

In order to accomplish the objection, a first aspect of the present invention is a two-way DC-DC converter comprising: a terminal for a low-voltage side; a terminal for a high-voltage side; a transformer including a winding wire for the low-voltage side and a winding wire for the high-voltage side; a switching section for the low-voltage side inserted between the terminal for the low-voltage side and the winding wire for the low-voltage side; a switching section for the high-voltage side inserted between the terminal for the high-voltage side and the winding wire for the high-voltage side; a rectifying element for the low-voltage side connected in parallel with switching elements in the switching section for the low-voltage side; a rectifying element for the high-voltage side connected in parallel with switching elements in the switching section for the high-voltage side; and a control circuit which controls switching elements in the switching section for the low-voltage side and switching elements in the switching section for the high-voltage side, wherein an LC resonant circuit is provided between the winding wire for the high-voltage side and the switching section for the higher voltage side, or between the winding wire for the low-voltage side and the switching section for the lower voltage side.

A second aspect of the present invention is the two-way DC-DC converter, wherein the LC resonant circuit is provided between the winding wire for the high-voltage side and the switching section for the higher voltage side.

A third aspect of the present invention is the two-way DC-DC converter, wherein both of the switching section for the lower voltage side and the switching section for the higher voltage side have a configuration in which four switching elements are bridged.

According to a first aspect of the present invention, a wave form of a current by switching can be changed into a sinusoidal one by an LC resonant circuit. Thereby, OFF timing of a switching element can be set in the vicinity of a zero crossing point of a current value. Accordingly, switching in the vicinity of the zero crossing point of the current value can be realized to cause remarkable reduction of switching losses.

Furthermore, a control system with a simple configuration can be realized because a primary DC-AC transformation section and a secondary DC-AC transformation section can be controlled by the same drive signal. At this time, a conversion efficiency can be improved, because a larger dead time of switching elements, which prevents shortings of switching elements, or a shorter driving period of a switching element is not required. Here, the shortings is caused, for example, by transmission delay in a transformer.

Moreover, according to a second aspect of the present invention, less losses in a LC resonant circuit can be caused by providing the circuit on the higher voltage side, on which a smaller current flows, in comparison with those of a LC resonant circuit which is provided on the lower voltage side.

Furthermore, according to a third aspect of the present invention, a simple configuration of a transformer can be realized because both of a switching element for the low-voltage side and a switching element for the high-voltage side form a bridge-type single-phase inverter which is connected to the transformer.

DETAILED DESCRIPTION OF THE PREFERRED EMBODIMENTS

Figure 1:
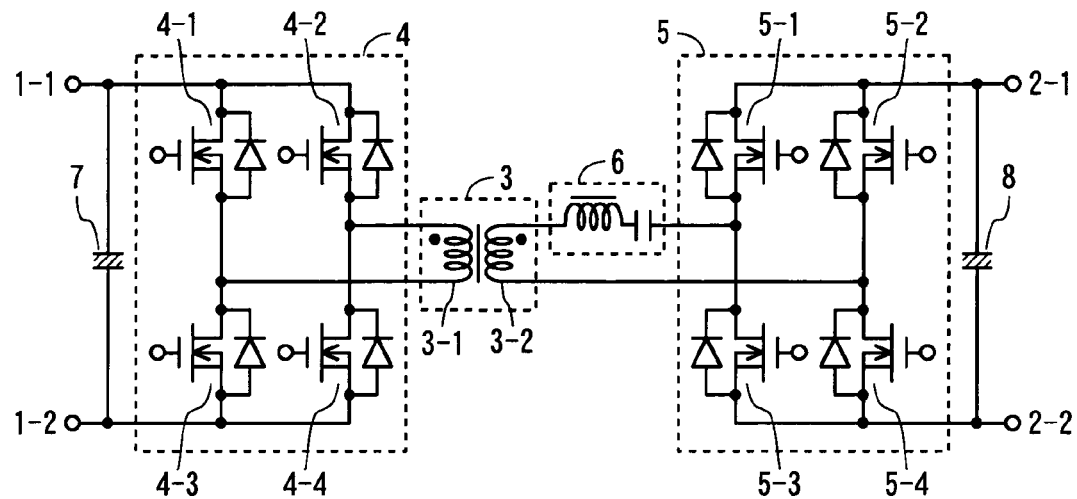
FIG. 1 is a circuit diagram showing one embodiment of a two-way DC-DC converter according to the present invention.

Hereinafter, the present invention will be explained in detail, referring to drawings. FIG. 1 is a circuit diagram showing one embodiment of a two-way DC-DC converter according to the present invention. The two-way DC-DC converter according to the present embodiment realizes two-way exchange of electric power between a DC power supply connected to terminals 1-1, 1-2 for a low-voltage side and terminals 2-1, 2-2 for a high-voltage side through a transformer 3. Hereinafter, the side of the terminals 1-1, 1-2 for a low-voltage side and that of the terminals 2-1, 2-2 for a high-voltage side will be sometimes called as a primary side, and a secondary side, respectively.

The transformer 3 comprises a winding wire 3-1 for a low-voltage side and a winding wire 3-2 for a high-voltage side. A step-up voltage ratio of the two-way DC-DC converter is defined by a turns ratio between the winding wire 3-1 for the low-voltage side and the winding wire 3-2 for the high-voltage side. A switching section 4 for the low-voltage side is inserted between the terminals 1-1, 1-2 for the low-voltage side, and the winding wire 3-1 for the low-voltage side, and a switching section 5 for the high-voltage side is inserted between the terminals 2-1, 2-2 for the high-voltage side and the winding wire 3-2 for the high-voltage side.

The switching section 4 for the lower voltage side has a configuration in which, four switching elements (hereinafter, called as FETs), such a FET, 4-1 through 4-4 are bridged, and the switching section 5 for the higher voltage side has a configuration in which, four FETs 5-1 through 5-4 are bridged.

Rectifying elements such as a diode are connected in parallel with each FET 4-1 through 4-4 and each FET 5-1 through 5-4. The rectifying elements may be a parasitic diode of FETs, or a joint diode which is separately connected. The switching section 4 for the lower voltage side and the switching section 5 for the higher voltage side could be considered to be a switching and rectifying section, respectively.

An LC resonant circuit 6 is inserted between the terminals 2-1, 2-2 for the high-voltage side and the winding wire 3-2 for the high-voltage side. Though the LC resonant circuit 6 is a feature of the present invention, the details will be described later.

Switching control of FETs 4-1 through 4-4 in the switching section 4 for the lower voltage side and FETs 5-1 through 5-4 in the switching section 5 for the higher voltage side is executed by a control circuit (not shown) comprising a CPU and the like. Here, capacitors 7, 8 connected to the primary side and the secondary side, respectively, are a capacitor for output smoothing.

Then, schematic explanation of operations in FIG. 1 will be made. In the first place, when electric power is supplied from the primary side (the left side in the drawing) to the secondary side (the right side in the drawing), alternate ON-OFF control between a pair of FET 4-1 and FET 4-4, and a pair of FET 4-2 and FET 4-3 in the switching section 4 for the lower voltage side is executed. A current according to the ON-OFF control flows on the winding wire 3-1 for the low-voltage side in the transformer 3.

A current induced on the winding wire 3-2 for the high-voltage side is input to the switching section 5 for the higher voltage side through the LC resonant circuit 6, and is smoothed in a smoothing capacitor after rectification by rectifying elements connected in parallel with FET 5-1 through FET 5-4. At this time, the current flowing on the primary side and on the secondary side is changed to a current with a sinusoidal wave form by the existence of the LC resonant circuit 6.

Though operations for a case in which electric power is supplied from the primary side to the secondary side have been described above, similar operations are applied to a case in which electric power is supplied from the secondary side to the primary side. Moreover, the primary side and the secondary side can be driven in complete synchronization, that is, by the same drive signal. In this case, power exchange between the primary side and the secondary side is executed according to relative differences in the voltage between both sides.

FIGS. 2A–2D are views showing differences in operations between the present invention and a previous technology. Though operations for a case in which electric power is supplied from the primary side to the secondary side will be explained, similar operations are applied to a case in which electric power is supplied from the secondary side to the primary side.

Figure 2A:
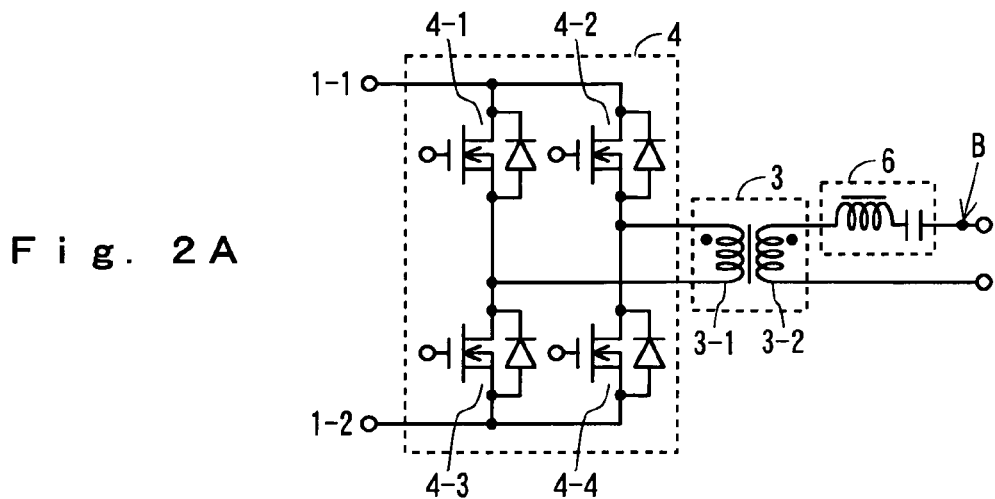
FIGS. 2A–2D are views explaining differences in conversion operations by the two-way DC-DC converter between the embodiment of the invention and a previous technology.
Figure 2B:
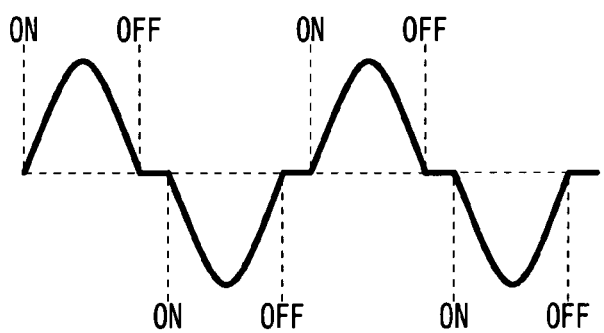
Figure 2C:
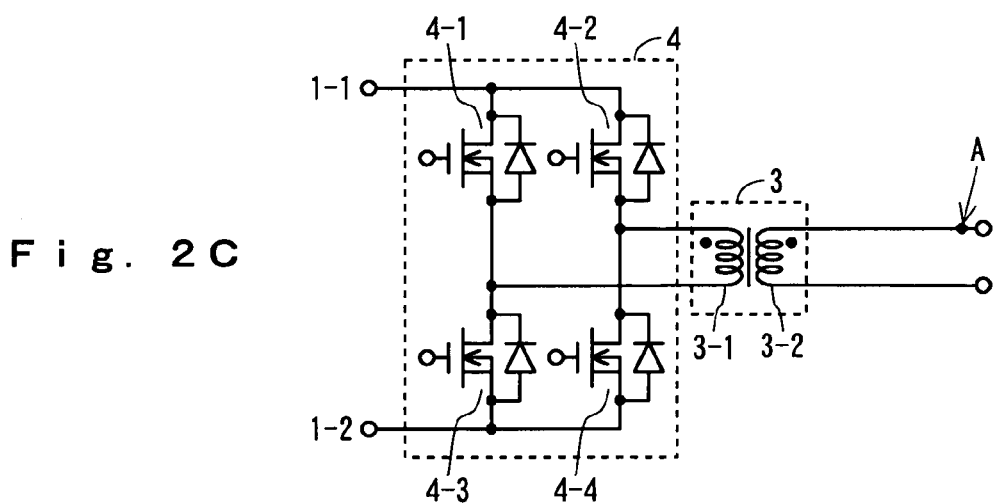
Figure 2D:
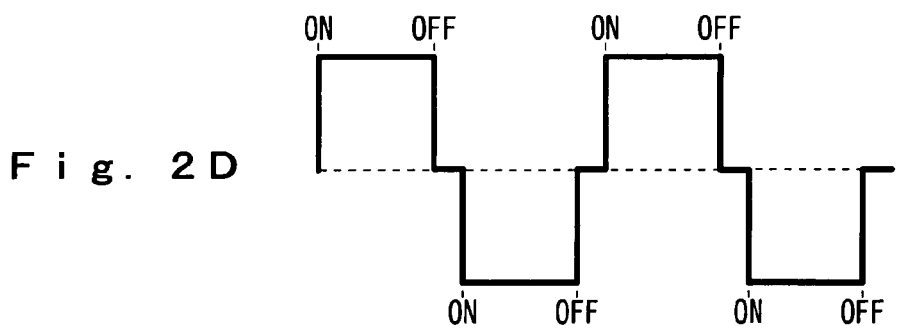

FIGS. 2A, 2C show diagrams of circuits according to the embodiment of the present invention and a previous technology, respectively. The circuits are excerpted in part necessary for explanation of differences in operations, by which electric power is supplied from the primary side to the secondary side in two-way DC-DC converters, between the embodiment of the present invention and the previous technology. FIGS. 2B, 2D show current wave forms at Point A in FIG. 2A and Point B in FIG. 2C, respectively.

In the previous two-way DC-DC converter (FIG. 2C), a current output through the winding wire 3-1 for the low-voltage side and the winding wire 3-2 for the high-voltage side in the transformer 3 is changed by alternate ON-OFF control between a pair of FET 4-1 and FET 4-4, and a pair of FET 4-2 and FET 4-3 in the switching section 4 for the lower voltage side to a current with a square-wave form, as shown in FIG. 2D. That is, a large current flows before OFF control of FET is executed, but, after the OFF control, the large current is changed into a zero current. At this time, large losses are caused because the current passes through an unsaturated range of FET.

On the other hand, in the two-way DC-DC converter (FIG. 2A) according to the embodiment of the present invention, a current output through the winding wire 3-1 for the low-voltage side and the winding wire 3-2 for the high-voltage side in the transformer 3 is changed by alternate ON-OFF control between a pair of FET 4-1 and FET 4-4, and a pair of FET 4-2 and FET 4-3 in the switching section 4 for the lower voltage side to a current with a sinusoidal wave form, as shown in FIG. 2B. This is caused by the existence of the LC resonant circuit 6.

Thereby, OFF timing of FET can be set in the vicinity of a zero crossing point at which the value of the current becomes approximately zero. Accordingly, switching of FET can be executed in the vicinity of the zero crossing point of the current value to cause remarkable reduction in the switching losses.

Figure 3A:
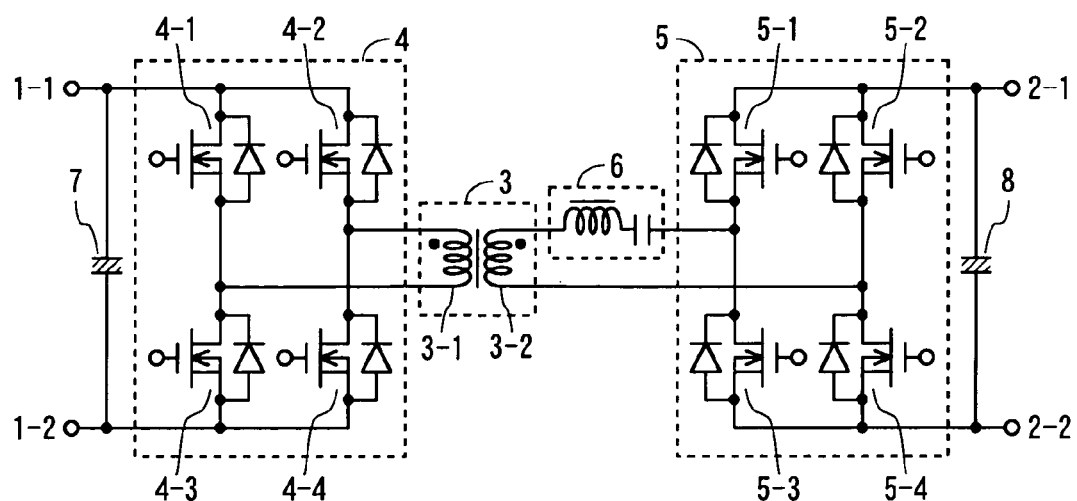
FIGS. 3A–3D are views explaining differences in operations in full synchronization by the two-way DC-DC converter between the embodiment of the invention and a previous technology.
Figure 3B:
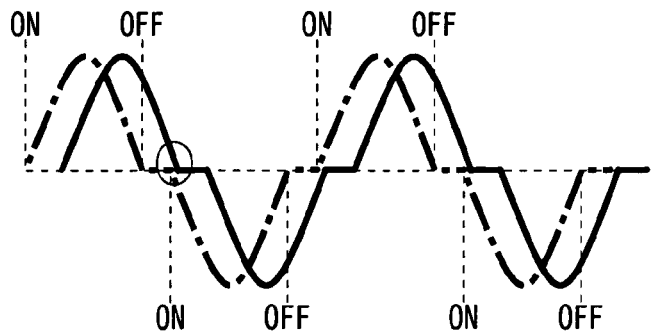
Figure 3C:
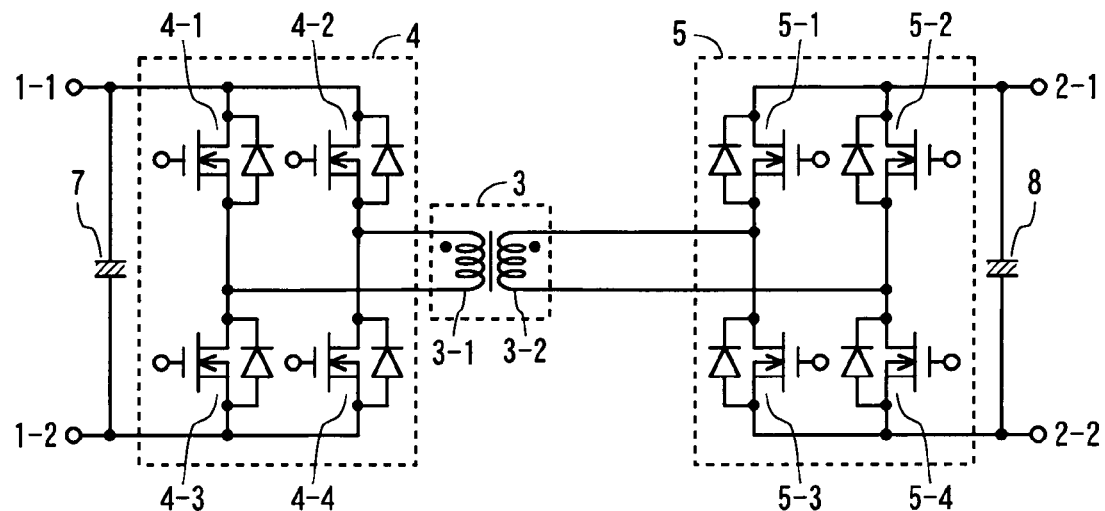

The present invention is also effective for a case in which the primary side and the secondary side is driven in full synchronization, that is, by the same driving signal. Hereinafter, this will be explained. FIGS. 3A, 3C show diagrams of circuits according to the embodiment of the present invention and a previous technology, respectively. The circuits are excerpted in part necessary for explanation of differences in operations, by which the primary side and the secondary side in the two-way DC-DC converters are driven in full synchronization. Noting switching on the primary side, FIGS. 3B, 3D show current wave forms of a primary-side current and a secondary-side current, respectively.

Figure 3D:
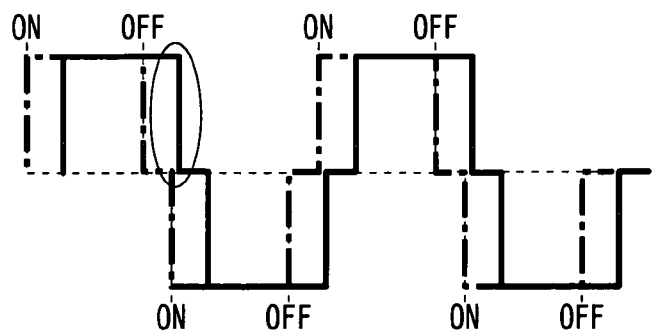

In the previous two-way DC-DC converter (FIG. 3C), the primary-side current with a square-wave form shown by dotted and dashed lines in FIG. 3D flows on the primary side (the winding wire 3-1 for the low-voltage side in the transformer 3) by alternate ON-OFF control between a pair of FET 4-1 and FET 4-4, and a pair of FET 4-2 and FET 4-3 in the switching section 4 for the lower voltage side.

By the primary-side current, the secondary-side current with a square-wave form shown by solid lines in FIG. 3D flows on the secondary side (the winding wire 3-2 for the high-voltage side in the transformer 3), but the secondary-side current has slight delay behind the primary-side current, for example, due to delay in the transformer 3.

When the primary side and the secondary side are driven in full synchronization under such a condition, ON-control of the secondary side is caused (a circled part in FIG. 3D), if the delay of the secondary side current exceeds dead time and a large current flows by ON-control of the primary side. Thereby, the large current by ON-control of the secondary side is further superimposed onto the large current by ON-control of the primary side.

In order to prevent the above superposition, a shorter driving period of FET on the secondary side or longer dead time is required for no ON-control of the secondary side while a large current by ON-control of the primary side flows. Thereby, the above measure becomes a big factor causing reduction in the conversion efficiency.

On the other hand, in the two-way DC-DC converter (FIG. 3A) according to the embodiment of the present invention, the primary-side current with a sinusoidal wave form shown by dotted and dashed lines in FIG. 3B flows on the primary side by alternate ON-OFF control between a pair of FET 4-1 and FET 4-4, and a pair of FET 4-2 and FET 4-3 in the switching section 4 for the lower voltage side.

By the primary-side current, the secondary-side current with a sinusoidal wave form shown by solid lines in FIG. 3B flows on the secondary side, but the secondary-side current has slight delay behind the primary-side current, for example, due to delay in the transformer 3.

Here, when the secondary side and the primary side are driven in full synchronization, ON-control of the secondary side is caused at a zero crossing point of the current by ON-control of the primary side (a circled part in FIG. 3B), even if the delay of the secondary side current exceed dead time. Thereby, the large current does not flow because both the large current by ON-control of the primary side and the current by ON-control of the secondary side are small.

Figure 4:
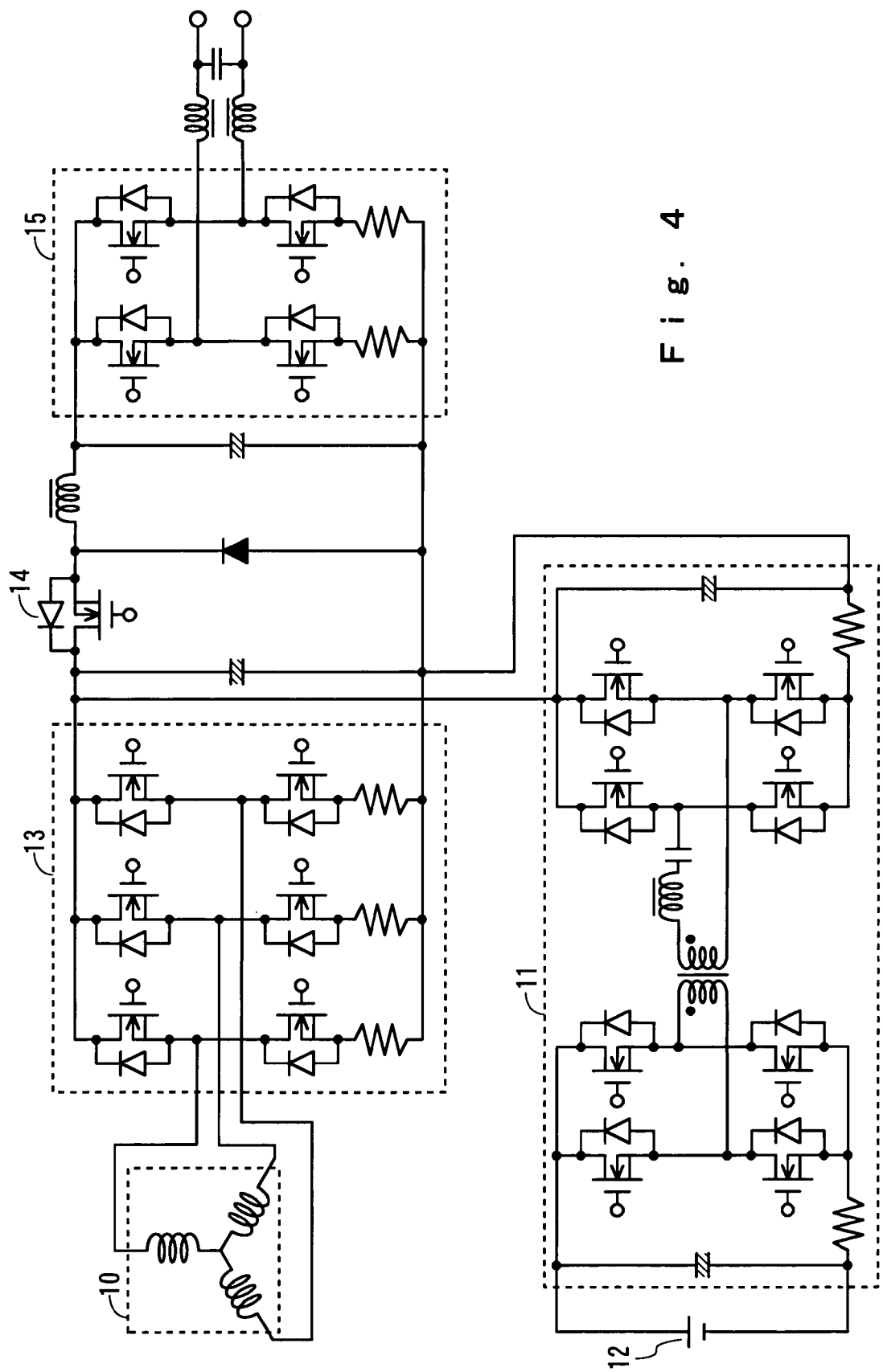
FIG. 4 is a circuit diagram showing one application example of the present invention.

FIG. 4 is a circuit diagram showing one application example of the present invention, in which two-way exchange of electric power between a DC power supply including a generator 10 and a battery 12 is executed, and the generator 10 is, for example, a three-phase multipolar magnet generator. When an engine is started, the switching section for the lower voltage side in the two-way DC-DC converter 11 is converted, the DC voltage of the battery 12, which has been step-upped by the above driving, is applied to the drive inverter (rectifier circuit) 13. By the drive inverter 13, the applied DC voltage is converted into a three-phase AC voltage, and is applied to the generator 10. Thereby, the generator 10 is started as an engine starting electric motor.

When the engine is started, the generator 10 is driven by the engine to stop switching operation of the drive inverter 13. The output of the generator 10 is rectified in the rectifier circuit (drive inverter) 13, is regulated in a regulator 14, and is converted in an inverter 15 into AC power of a predetermined frequency.

If a switching section 5-3 for the higher voltage side in the two-way DC-DC converter 11 is driven when the voltage of the battery 12 is reduced, the output voltage of the rectifier circuit 13 is reduced in the two-way DC-DC converter 11. Thereby, the battery 12 can be charged by the reduced voltage.

The switching section for the lower voltage side and the switching section for the higher voltage side of the two-way DC-DC converter 11 can be also driven in full synchronization with each other, when the generator 10 is driven by the engine. Thus, automatic power exchange between the side of the rectifier circuit (drive inverter) 13 and that of the battery 12 can be executed according to relative differences in the voltage between the primary side and the secondary side caused by the turns ratio of the transformer.

Though the embodiments have been explained as described above, various kinds of changes and modifications could be made. For example, the LC resonant circuit can be provided in the primary side. In this case, the LC resonant circuit may be inserted between the switching section for the lower voltage side and the winding wire for the low-voltage side.

The present invention can be used for a case in which two-way exchange of electric power not only between the batteries or between the DC power supply comprising the engine generator and the batteries, but also between DC power supply systems such as a common generator, a solar light generating system, a wind power generation system, and a fuel cell system is executed. For example, two-way exchange of electric power between an electrical power system for running and a safety electrical system can be realized for example, for a hybrid electric vehicle.

As the detailed explanation has been made above, a wave form of a current by switching can be changed into a sinusoidal one by an LC resonant circuit, according to the present invention. Thereby, OFF timing of a switching element can be set in the vicinity of a zero crossing point of a current value. Accordingly, switching in the vicinity of the zero crossing point of the current value can be realized to cause remarkable reduction of switching losses.

Moreover, a switching section for the lower voltage side and a switching section for the higher voltage side can be controlled by the same drive signal. At this time, a conversion efficiency can be improved, because a larger dead time or a shorter driving period of a switching element is not required in order to control flowing of a large current, which is caused, for example, by transmission delay in a transformer, on the switching element.

Furthermore, the switching section for the lower voltage side and the switching section for the higher voltage side can be controlled by the same drive signal to cause no requirements for changing conversion direction at driving. Thereby, a load to a control system can be reduced.

What is claimed is:

1. A two-way DC-DC converter comprising: a terminal for a low-voltage side; a terminal for a high-voltage side; a transformer including a winding wire for the low-voltage side and a winding wire for the high-voltage side; a switching section for the low-voltage side inserted between the terminal for the low-voltage side and the winding wire for the low-voltage side; a switching section for the high-voltage side inserted between the terminal for the high-voltage side and the winding wire for the high-voltage side; a rectifying element for the low-voltage side connected in parallel with switching elements in the switching section for the low-voltage side; a rectifying element for the high-voltage side connected in parallel with switching elements in the switching section for the high-voltage side; and a control circuit which controls switching elements in the switching section for the low-voltage side and switching elements in the switching section for the high-voltage side, wherein an LC resonant circuit is provided between the winding wire for the high-voltage side and the switching section for the higher voltage side, thereby waveforms of currents flowing on the winding wires of the low and high voltage side are changed into sinusoidal waveforms and Off timing of each switching element is set in the vicinity of a zero crossing point of a current value.

2. The two-way DC-DC converter according to claim 1, wherein both of the switching section for the lower voltage side and the switching section for the higher voltage side have a configuration in which four switching elements are bridged.

* * * * *